United States Patent
Cui et al.

(10) Patent No.: US 11,485,011 B2
(45) Date of Patent: Nov. 1, 2022

(54) ROBOT MANIPULATOR AND ROBOT

(71) Applicants: CLOUDMINDS (BEIJING) TECHNOLOGIES CO., LTD., Beijing (CN); INNFOS DRIVE (BEIJING) TECHNOLOGIES CO., LTD., Beijing (CN)

(72) Inventors: Haotian Cui, Beijing (CN); Xunge Yan, Beijing (CN); William Xiao-qing Huang, Beijing (CN); Cheng Luo, Guangxi (CN); Yufeng Zhang, Beijing (CN)

(73) Assignees: CLOUDMINDS (BEIJING) TECHNOLOGIES CO., LTD., Beijing (CN); CLOUDMINDS ROBOTICS CO., LTD., Shanghai (CN)

( * ) Notice: Subject to any disclaimer, the term of this patent is extended or adjusted under 35 U.S.C. 154(b) by 264 days.

(21) Appl. No.: 16/806,922

(22) Filed: Mar. 2, 2020

(65) Prior Publication Data
US 2020/0282550 A1    Sep. 10, 2020

(30) Foreign Application Priority Data
Mar. 1, 2019    (CN) .......................... 201910154413.8

(51) Int. Cl.
*B25J 9/10*       (2006.01)
*B25J 15/02*      (2006.01)
*B25J 17/02*      (2006.01)
*B25J 15/00*      (2006.01)

(52) U.S. Cl.
CPC ............... *B25J 9/102* (2013.01); *B25J 9/104* (2013.01); *B25J 9/108* (2013.01); *B25J 15/0213* (2013.01); *B25J 17/02* (2013.01); *B25J 15/0009* (2013.01)

(58) Field of Classification Search
CPC ... B25J 9/102; B25J 9/104; B25J 9/108; B25J 15/0213; B25J 17/02; B25J 15/0009
See application file for complete search history.

(56) References Cited

U.S. PATENT DOCUMENTS 5,697,256 A * 12/1997 Matteo ..................... B25J 9/104
                                                        475/210
6,658,962 B1 * 12/2003 Rosheim ............. B25J 15/0009
                                                        74/490.05
6,722,178 B1    4/2004 Ito et al.
(Continued)

FOREIGN PATENT DOCUMENTS

JP    2002540951 A       12/2002
JP    2015016513 A  *    1/2015
WO    2017161150 A1      9/2017

OTHER PUBLICATIONS

European search report and European search opinion dated Jul. 27, 2020; EP 20159193.0.

(Continued)

*Primary Examiner* — Zakaria Elahmadi (57) ABSTRACT

A robot manipulator includes: an arm body; a wrist effector, connected to the arm body; a multi-degree-of-freedom (DOF) connecting device, rotatably connected to the wrist effector; and a grabber, connected to the multi-DOF connecting device, wherein the multi-DOF connecting device is configured to receive a power output by the wrist effector and drive the grabber to rotate.

17 Claims, 11 Drawing Sheets

(56) References Cited

U.S. PATENT DOCUMENTS

2011/0257765 A1\* 10/2011 Evans ..................... A61F 2/70
 623/24
2015/0182353 A1 7/2015 Evans et al.
2015/0257903 A1\* 9/2015 Perry ..................... A61F 2/586
 623/24

OTHER PUBLICATIONS

Bajaj Neil M et al: "State of the Art in Artificial Wrists: A Review of Prosthetic and Robotic Wrist Design", IEEE Transactions On Robotics, IEEE Service Center, Piscataway, NJ, US, vol. 35, No. 1, Feb. 1, 2019 (Feb. 1, 2019), pp. 261-277, XPO1 1 708908, ISSN: 1552-3098, DOI: 10.1109/TRO.2018.2865890.
1st Office Action dated Jan. 19, 2021 by the JP Office; JP 2020-032175.

\* cited by examiner

ROBOT MANIPULATOR AND ROBOT

CROSS-REFERENCE TO RELATED APPLICATIONS

This application claims priority to Chinese Patent Application No. 201910154413.8, filed with the Chinese Patent Office on Mar. 1, 2019, titled "ROBOT MANIPULATOR AND ROBOT", the entire contents of which are incorporated herein by reference.

TECHNICAL FIELD

Embodiments of the present application relate to the technical field of robots, and in particular, relate to a robot manipulator and a robot.

BACKGROUND

A robot manipulator is a most representative complex part in a bionic robot system, and is a fundamental part for a bionic robot to perform a grabbing task.

During implementation of the present application, the inventors have identified that one wrist effector in a conventional robot manipulator may only drive the grabber of the robot manipulator to rotate in one direction. Corresponding wrist effectors need to be configured if degree of freedom of the grabber is to be improved.

SUMMARY

An embodiment of the present application provides a robot manipulator. The robot manipulator includes: an arm body; a wrist effector, connected to the arm body; a multi-degree-of-freedom (DOF) connecting device, rotatably connected to the wrist effector; and a grabber, connected to the multi-DOF connecting device, wherein the multi-DOF connecting device is configured to receive a power output by the wrist effector and drive the grabber to rotate.

Another embodiment of the present application provides a robot, The robot includes at least one robot manipulator. The robot manipulator includes: an arm body; a wrist effector, connected to the arm body; a multi-degree-of-freedom (DOF) connecting device, rotatably connected to the wrist effector; and a grabber, connected to the multi-DOF connecting device, wherein the multi-DOF connecting device is configured to receive a power output by the wrist effector and drive the grabber to rotate.

BRIEF DESCRIPTION OF THE DRAWINGS

For clearer descriptions of the technical solutions according to the specific embodiments of the present application or the technical solutions in the related art, the accompanying drawings incorporated for illustrating the specific embodiments or the related art are briefly described hereinafter. In all the accompanying drawings, like elements or parts are generally denoted by like reference numerals. In the accompanying drawings, various elements or parts are not necessarily drawn according to the actual scale.

REFERENCE NUMERALS AND DENOTATIONS THEREOF

Arm body 21;
Lift boom effector 211;
Groove 2111;
Incline boom effector 212;
Boss 2121;
First connecting frame 213;
First connecting stand plate 2131;
Second connecting stand plate 2132;
Connecting bearing 2133;
Fixing plate 2134;
Rotate elbow effector 214;
Elbow effector 215;
Second connecting frame 216;
Third connecting stand plate 2161;
Rotate wrist effector 217;
Wrist effector 22;
First output shaft 221;
multi-DOF connecting device 23;
Bevel gear driving device 231
First driving bevel gear 2312;
Second driving bevel gear 2313;
First planetary gear 2314;
Supporting member 2315;
First inner bearing 2316;
Second inner bearing 2317;
Third inner bearing 2318;
First outer bearing 2319;
Second outer bearing 23110;
Third outer bearing 23111;
Fourth outer bearing 23112;

Second planetary gear 2310;
First sink slot 2311a;
Second sink slot 2311b;
Third sink slot 2311c;
Fourth sink slot 2311d;
Second transmission device 234;
Third pulley 2342;
Fourth pulley 2343;
Grabber 24;
U-shaped connecting frame 241;
Grabber body 242.
Reducer device 235
Motor 236

DETAILED DESCRIPTION

The embodiments containing the technical solutions of the present application are described in detail with reference to the accompanying drawings. The embodiments hereinafter are only used to clearly describe the technical solutions of the present application. Therefore, these embodiments are only used as examples, but are not intended to limit the protection scope of the present application.

It should be noted that unless otherwise specified, the technical terms and scientific terms used in the present application shall express general meanings that may be understood by a person skilled in the art.

In the description of the present application, it should be understood that the terms "central", "longitudinal", "transversal", "length", "width", "thickness", "upper", "lower", "front", "rear", "left", "right", "vertical", "horizontal", "top", "bottom", "inner", "outer", "clockwise", "counterclockwise", "axial", "radial", "circumferential" and the like indicate orientations and position relationships which are based on the illustrations in the accompanying drawings, and these terms are merely for ease and brevity of the description, instead of indicating or implying that the devices or elements shall have a particular orientation and shall be structured and operated based on the particular orientation. Accordingly, these terms shall not be construed as limiting the present application.

In addition, terms of "first", "second" are only used for description, but shall not be understood as indication or implication of relative importance or implicit indication of the number of the specific technical features. In the description of the present application, the term "more" or "a plurality of" signifies at least two, unless otherwise specified.

In the description of the present application, it should be noted that unless otherwise specified and defined, the terms "mounted", "coupled", "connected" and "fixed" and derivative forms thereof shall be understood in a broad sense, which, for example, may be understood as fixed connection, detachable connection or integral connection; may be understood as mechanical connection or electrical connection, or understood as direct connection, indirect connection via an intermediate medium, or communication between the interiors of two elements or interactions between two elements. Persons of ordinary skill in the art may understand the specific meanings of the above terms in the present application according to the actual circumstances and contexts.

In the present application, unless otherwise specified or defined, by defining that a first feature is disposed "above" or "below" or "beneath" a second feature, it may be meant that the first feature is in direct contact with the second feature, or the first feature is in indirect contact with the second feature via an intermediate medium. In addition, by defining that a first feature is disposed "over" or "above" a second feature, it may be meant that the first feature is rightly over the second feature or is obliquely above the second feature, or the horizontal height of the first feature is greater than that of the second feature. In addition, by defining that a first feature is disposed "under" or "blow, or "beneath" a second feature, it may be meant that the first feature is rightly under the second feature or is obliquely below the second feature, or the horizontal height of the first feature is less than that of the second feature.

Figure 1:
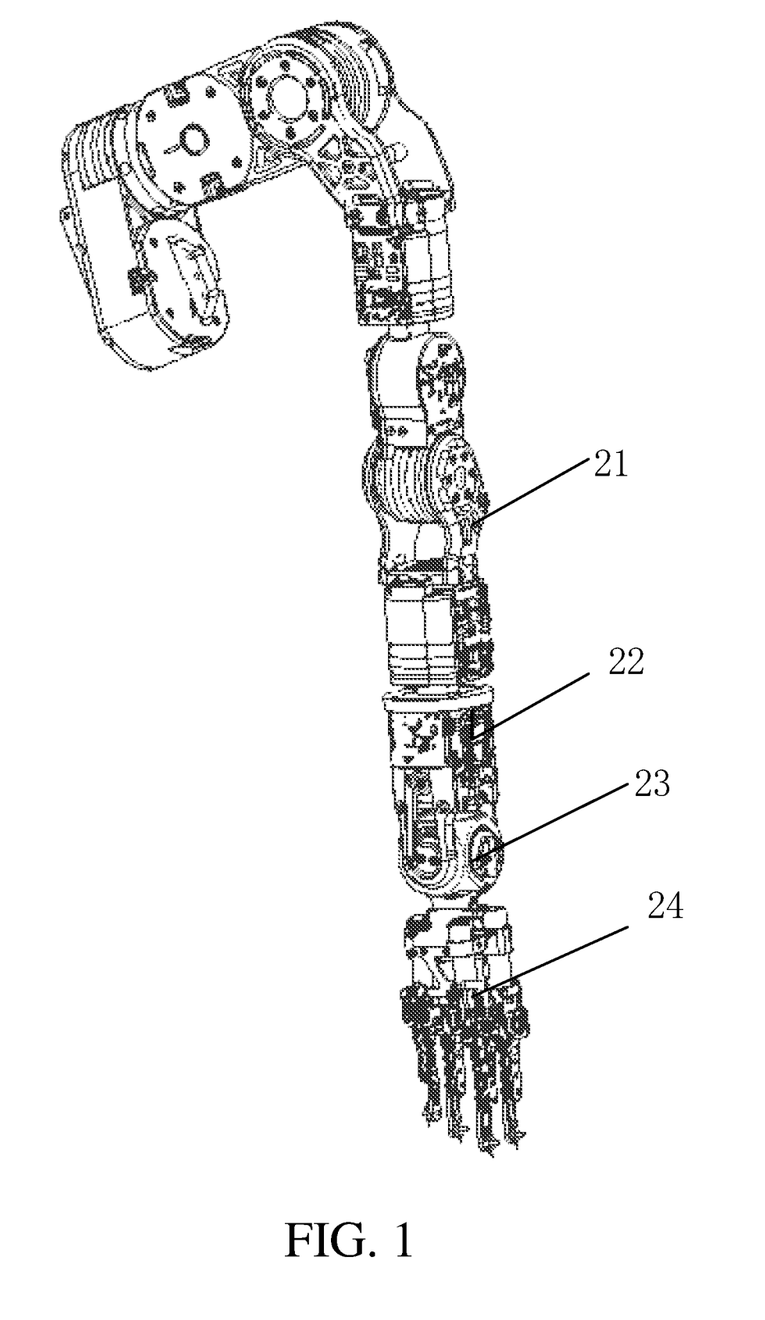
FIG. 1 is a schematic view of a robot manipulator according an embodiment of the present application.
Figure 2:
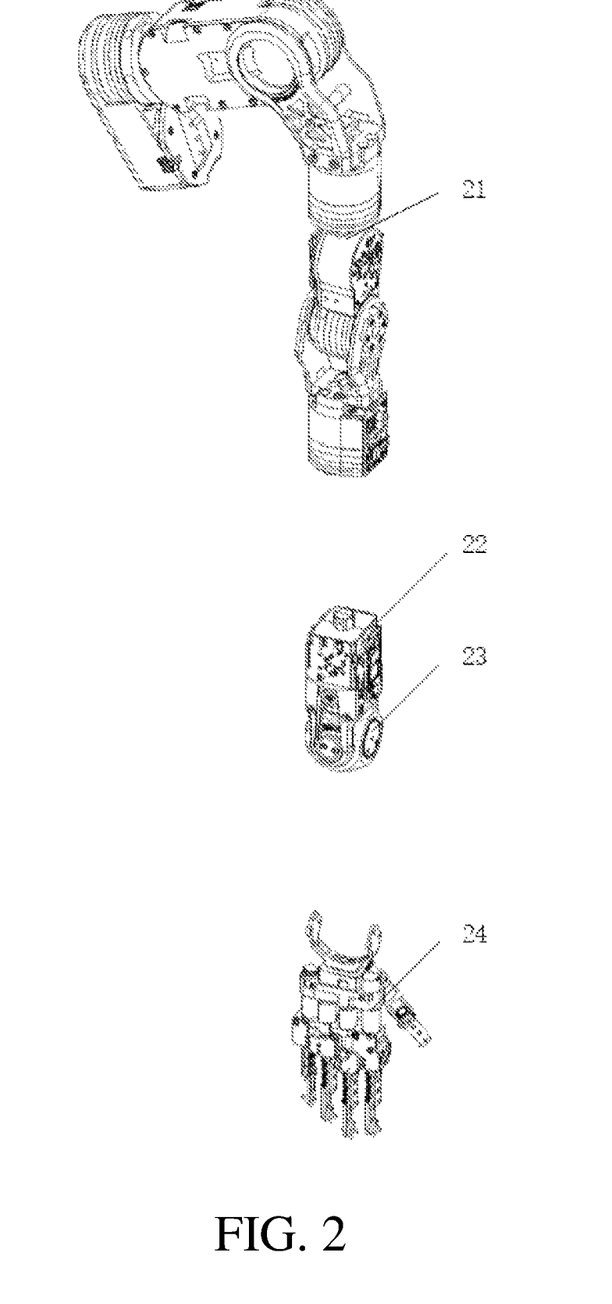
FIG. 2 is an exploded view of a robot manipulator according to an embodiment of the present application.

Referring to FIG. 1 and FIG. 2, a robot manipulator 20 includes an arm body 21, a wrist effector 22, a multi-degree-of-freedom (DOF) connecting device 23, and a grabber 24. The multi-DOF connecting device 23 is connected to the wrist effector 22 and the grabber 24, and the arm body 21 is connected to the wrist effector 22.

Figure 3:
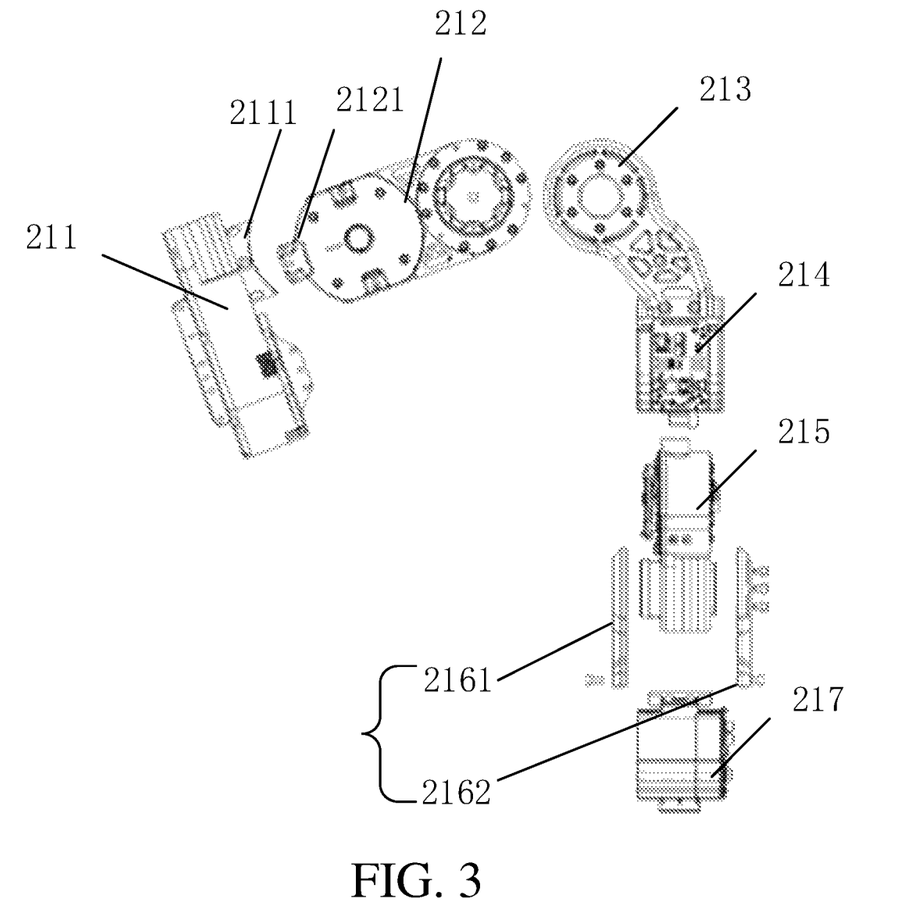
FIG. 3 is an exploded view of an arm body of the robot manipulator according to an embodiment of the present application.

With respect to the arm body 21, as illustrated in FIG. 3, the arm body 21 includes a lift boom effector 211, an incline boom effector 212, a first connecting frame 213, a rotate elbow effector 214, an elbow effector 215, a second connecting frame 216 and a rotate wrist effector 217.

Figure 4:
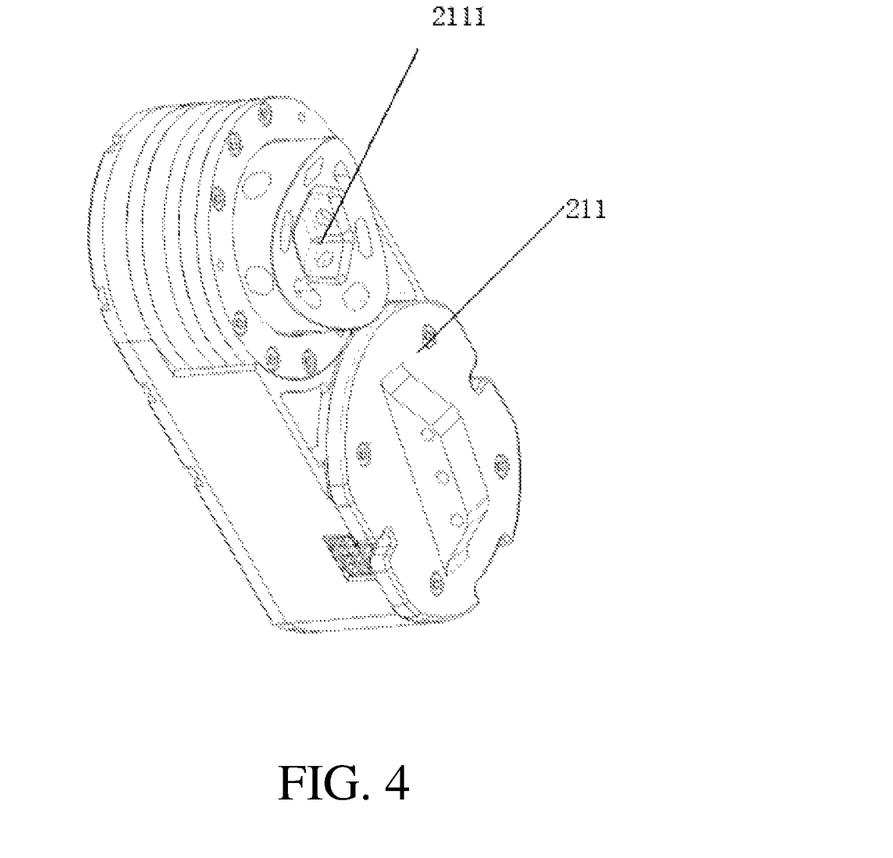
FIG. 4 is a schematic view of a lift boom effector of the robot manipulator according to an embodiment of the present application.

With respect to the lift boom effector 211, as illustrated in FIG. 3 and FIG. 4, an output end of the lift boom effector 211 is provided with a groove 2111. The output end of the lift boom effector 211 is configured to output a power. In some embodiments, the lift boom effector 211 may be an outer rotor effector, and the output end of the lift boom effector 211 is a flange, such that the lift boom effector 211 outputs a greater torque.

With respect to the incline boom effector 212, still referring to FIG. 3, a case of the incline boom effector 212 is provided with a boss 2121. The boss 2121 is clamped into the groove 2111, and the boss 2121 is over-fitted with the groove 2111, such that the incline boom effector 212 is fixed to the output end of the lift boom effector 211. When the output end of the lift boom effector 211 rotates, the incline boom effector 212 may also rotate about an axial line of the output end of the lift boom effector 211.

It may be understood that in some other embodiments, the incline boom effector 212 may be connected to the output end of the lift boom effector 211 in other modes other than the above described mode. For example, instead, the incline boom effector 212 may be directly threadably fixed to the output end of the lift boom effector 211.

Figure 5:
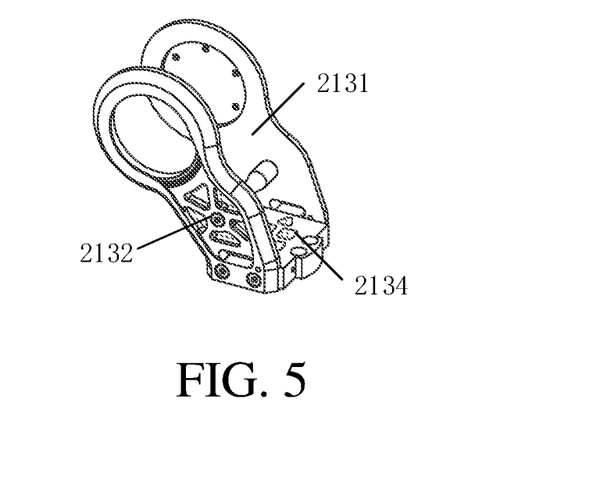
FIG. 5 is a schematic view of a first connecting frame of the robot manipulator according to an embodiment of the present application.
Figure 6:
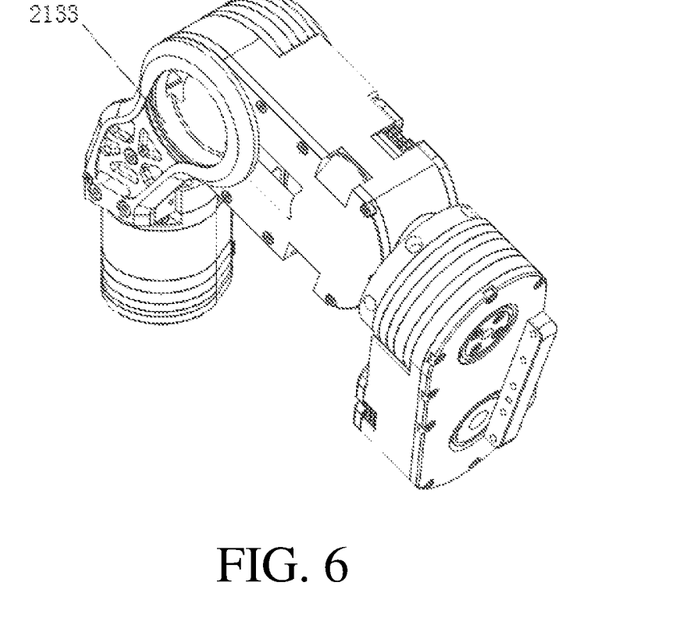
FIG. 6 is a schematic view of some elements or parts of the robot manipulator according to an embodiment of the present application.

With respect to the first connecting frame 213, as illustrated in FIG. 3, FIG. 5, and FIG. 6, the first connecting frame 213 includes a first connecting stand plate 2131, a second connecting stand plate 2132, a connecting bearing 2133, and a fixing plate 2134. One end of the first connecting stand plate 2131 is threaded to an output end of the incline boom effector 212, and the other end of the first connecting stand plate 2131 is threaded to the fixing plate 2134, such that both ends of the first connecting stand plate 2131 are respectively connected to the output end of the incline boom effector 212 and the fixing plate 2134. Such fixing mode is secure and reliable, which is favorable to torque transmission, disassembling, and repair and part replacement. An inner ring of the connecting bearing 2133 is fixed to a side of the case of the incline boom effector 212 away from the output end thereof, and an outer ring of the connecting bearing 2133 is fixed to one end of the second connecting stand plate 2132, such that the second connecting stand plate 2132 is rotatably connected to the case of the incline boom effector 212. The other end of the second connecting stand plate 2132 is threaded to the fixing plate 2134, and the second connecting stand plate 2132 is aligned with the first connecting stand plate 2131, such that the first connecting stand plate 2131 and the second connecting stand plate 2132 are parallelly disposed. A wiring space is reserved between the first connecting stand plate 2131 and the second connecting stand plate 2132 for ease of wiring, such that the assembling is more convenient.

It may be understood that the second connecting stand plate 2132 may also be rotatably connected to the case of the incline boom effector 212 in another connection mode achieving the same connection effect, for example, gap fitting or the like.

Since the end of the first connecting stand plate 2131 is fixed to the output end of the incline boom effector 212, and the second connecting stand plate 2132 is rotatably connected to the case of the incline boom effector 212, when the output end of the incline boom effector 212 drives the first connecting stand plate 2131 to rotate, the second connecting stand plate 2132 rotates as a driven member, and meanwhile, the fixing plate 2134 may also rotate accordingly because the fixing plate 2134 is fixed to the first connecting stand plate 2131 and the second connecting stand plate 2132.

With respect to the rotate elbow effector 214, still referring to FIG. 3, the rotate elbow effector 214 is connected to the fixing plate 2134, such that the rotate elbow effector 214 is connected to the first connecting frame 213. In this way, the rotate elbow effector 214 is connected to the incline boom effector 212 by the first connecting frame 213. When the output end of the incline boom effector 212 rotates, the rotate elbow effector 214 may also rotate about an axial line of the output end of the incline boom effector 212.

It may be understood that the other ends of the first connecting stand plate 2131 and the second connecting stand plate 2132 may also be directly threaded or snap-fitted to the rotate elbow effector 214. In addition, the first connecting frame 213 may also be another device achieving the same connection effect, which is not described herein any further.

With respect to the elbow effector 215, still referring to FIG. 3, a case of the elbow effector 215 is fixed to an output end of the rotate elbow effector 214. When the output end of the rotate elbow effector 214 rotates, the elbow effector 215 may also rotate about an axial line of the output end of the rotate elbow effector 214.

With respect to the second connecting frame 216 and the rotate wrist effector 217, still referring to FIG. 3, the second connecting frame 216 includes a third connecting stand plate 2161 and a fourth connecting stand plate 2162. One end of the third connecting stand plate 2161 is fixed to an output end of the elbow effector 215, the other end of the third connecting stand plate 2161 is fixed to a case of the rotate wrist effector 217, one end of the fourth connecting stand plate 2162 is rotatably connected to a case of the elbow effector 215, and the other end of the fourth connecting stand plate 2162 is fixed to the case of the rotate wrist effector 217, such that the rotate wrist effector 217 is connected to the elbow effector 215 by the second connecting frame 216. When the output end of the elbow effector 215 rotates, the rotate wrist effector 217 may also rotate about an axial line of the output end of the rotate wrist effector 215.

In some embodiments, the end of the fourth connecting stand plate 2162 may be rotatably connected to the case of the elbow effector 215 optionally by gap fitting or bearing connection or the like.

It may be understood that the third connecting stand plate 2161 and the fourth connecting stand plate 2162 may be connected to the rotate wrist effector 217 in other modes other than the above described connection mode. Instead, the other ends of the third connecting stand plate 2161 and the fourth connecting stand plate 2162 may be fixed to the case of the rotate wrist effector 217 by a connecting plate. In addition, the second connecting frame 216 may also be another device achieving the same connection effect, which is not described herein any further.

By division of the arm body 21 into different effectors and connecting frames, the effectors may be directly connected or indirectly connected by the connecting frame, such that modularized design of the robot manipulator 20 is implemented, which is favorable to assembling, repair and part replacement of the robot manipulator. Nevertheless, with respect to different types of robot manipulators 20 or robot manipulators 20 imposing different design requirements, requirements on degree of freedom are also different. Correspondingly, the number of effectors and the number of connecting frames included in the arm body 21 are also different.

Figure 7:
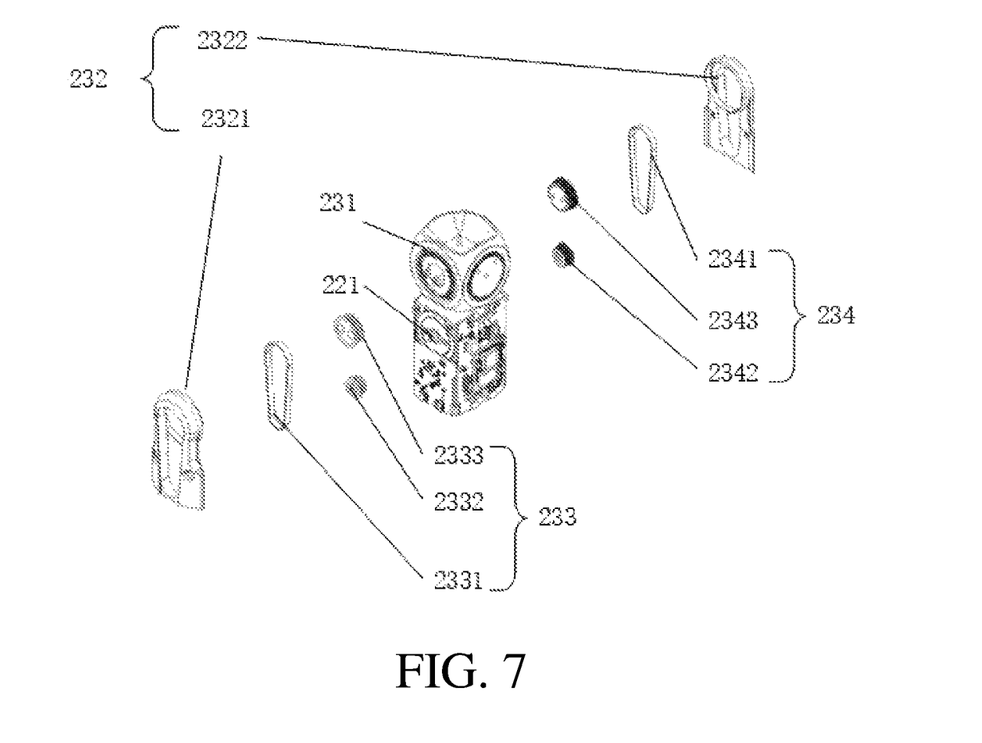
FIG. 7 is an exploded view of a first transmission device and a second transmission device of the robot manipulator according to an embodiment of the present application.
Figure 8:
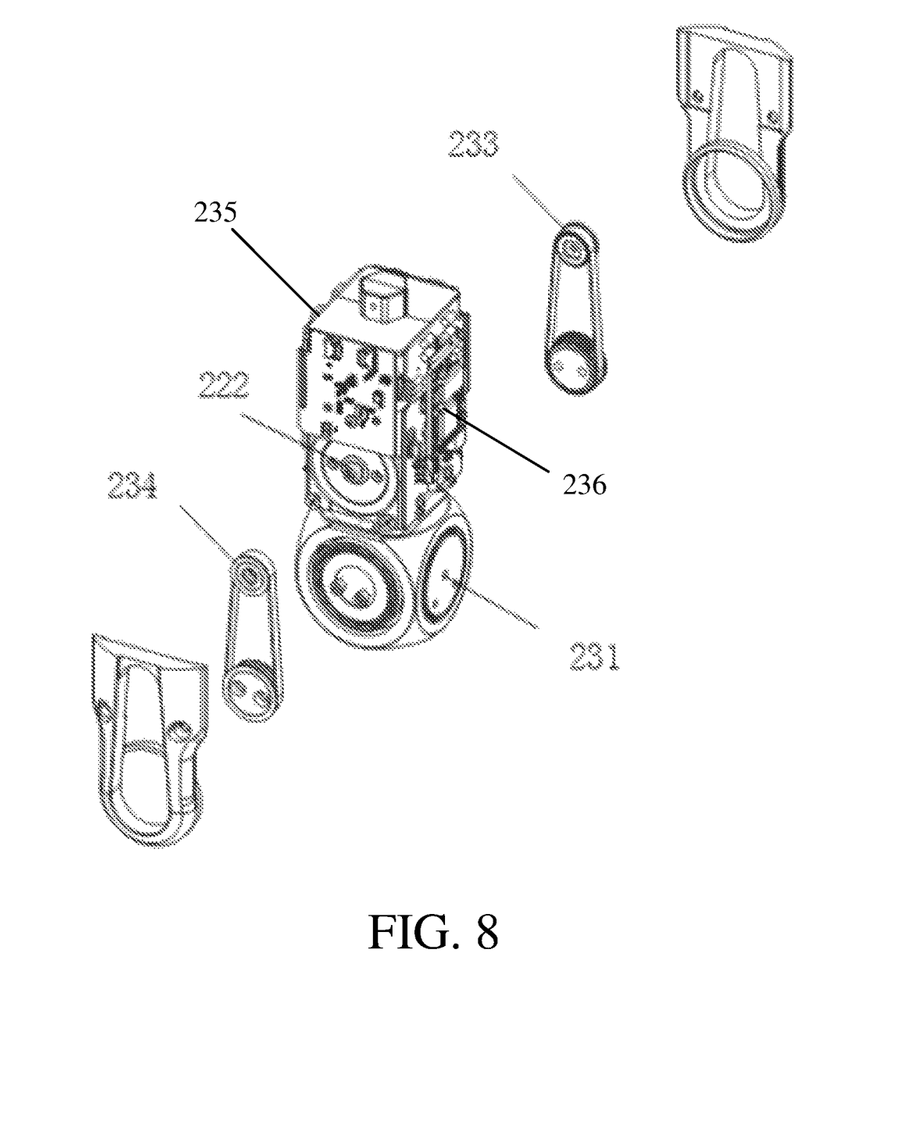
FIG. 8 is another exploded view of the first transmission device and the second transmission device of the robot manipulator according to an embodiment of the present application.

With respect to the wrist effector 22, as illustrated in FIG. 7 and FIG. 8, the wrist effector 22 includes a first motor (not shown in the drawings) and a second motor (not shown in the drawings), wherein the first motor outputs a power by a first output shaft 221, and the second motor outputs a power by a second output shaft 222. The first output shaft 221 and the second output shaft 222 may rotate about the same direction or different directions at the same speed or different speeds respectively. A case of the wrist effector 22 is fixed to an output end of the rotate wrist effector 217, such that the wrist effector 22 is connected to the arm body 21, as illustrated in FIG. 6. When the output end of the rotate wrist effector 217 rotates, the wrist effector 22 may also rotate about an axial line of the output end of the rotate wrist effector 217.

Figure 9:
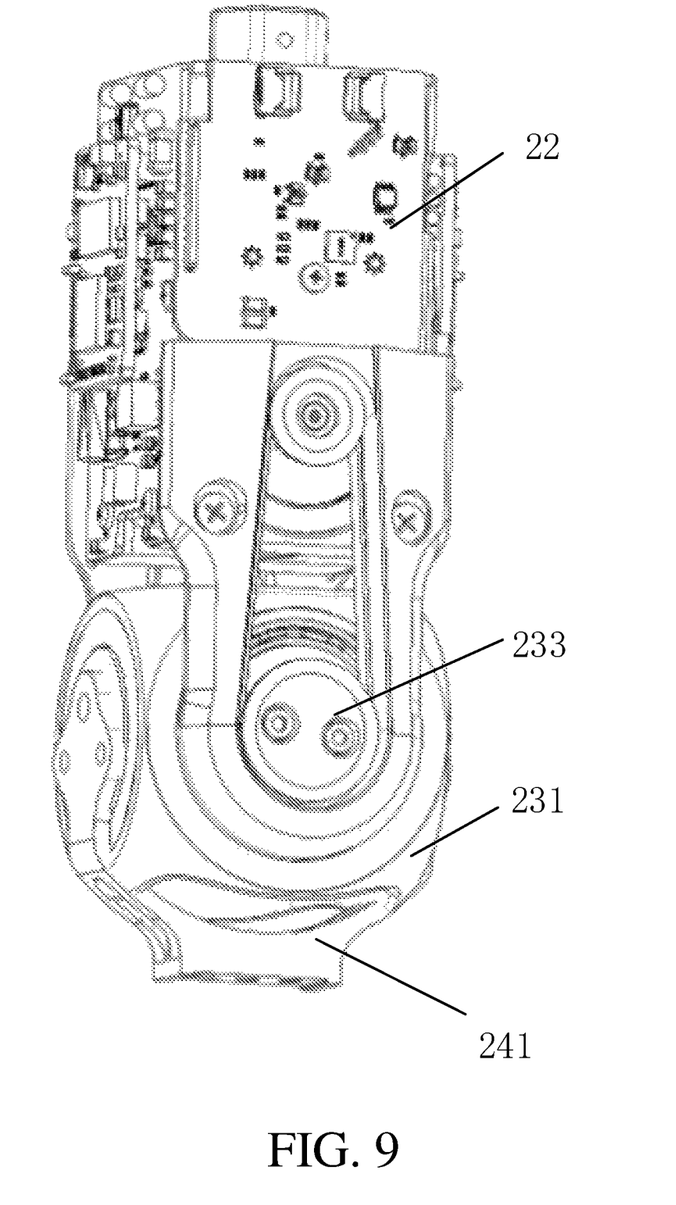
FIG. 9 is a schematic view of a multi-DOF connecting device and a wrist effector of the robot manipulator according to an embodiment of the present application.

With respect to the multi-DOF connecting device 23, as illustrated in FIG. 7 to FIG. 9, the multi-DOF connecting device 23 includes a bevel gear driving device 231, a connecting member 232, a first transmission device 233, and a second transmission device 234.

Figure 10:
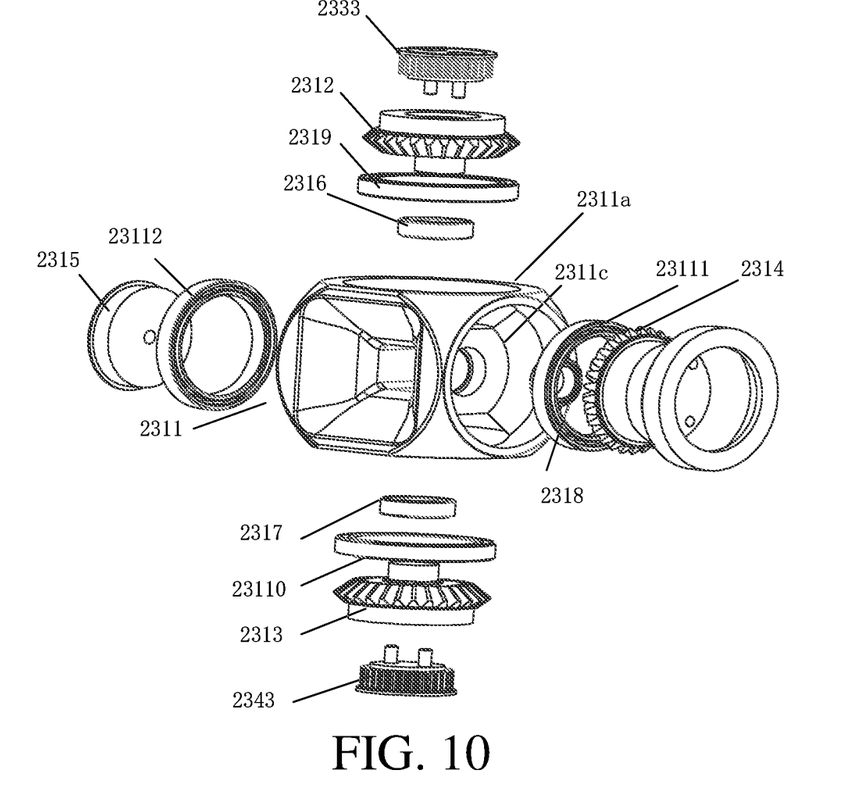
FIG. 10 is an exploded view of a bevel gear driving device of the robot manipulator according to an embodiment of the present application.
Figure 11:
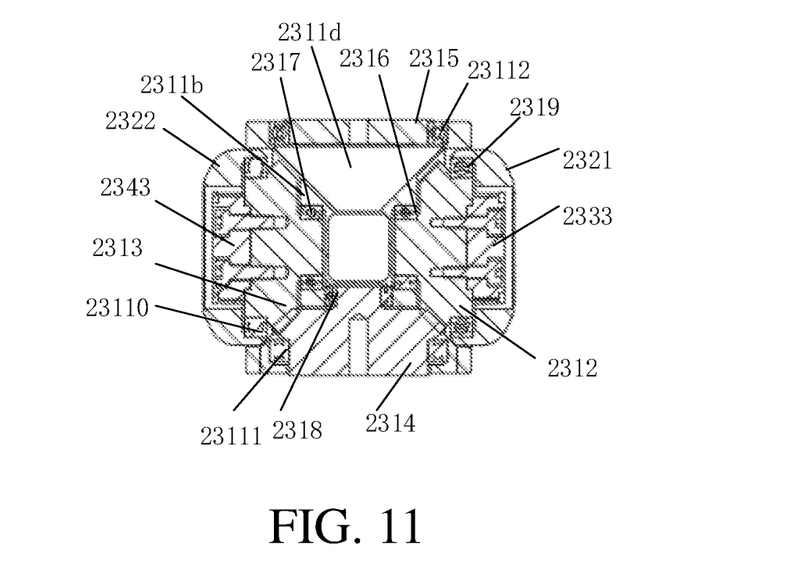
FIG. 11 is a section view of the bevel gear driving device of the robot manipulator according to an embodiment of the present application.

With respect to the bevel gear driving device 231, as illustrated in FIG. 10 and FIG. 11, the bevel gear driving device 231 includes a bracket 2311, a first driving bevel gear 2312, a second driving bevel gear 2313, a first planetary gear 2314, a supporting member 2315, a first inner bearing 2316, a second inner bearing 2317, a third inner bearing 2318, a first outer bearing 2319, a second outer bearing 23110, a third outer bearing 23111, and a fourth outer bearing 23112. The bracket 2311 is provided with a first sink slot 2311a, a second sink slot 2311b, a third sink slot 2311c, and a fourth sink slot 2311d. The first sink slot 2311a and the second sink slot 2311b are oppositely disposed, and the third sink slot 2311c and the fourth sink slot 2311d are oppositely disposed. In addition, the third sink slot 2311c is communicated with the first sink slot 2311a and the second sink slot 2311b respectively, and the fourth sink slot 2311d is communicated with the first sink slot 2311a and the second sink slot 2311b respectively. The first inner bearing 2316 is fixed to the first sink slot 2311a, a shaft end of the first driving bevel gear 2312 is sleeved onto of the interior of the first inner bearing 2316, such that the first driving bevel gear 2312 is rotatably connected to the bracket 2311. The first outer bearing 2319 is sleeved onto the exterior of the other shaft end of the first driving bevel gear 2312. The second inner bearing 2317 is fixed into the second sink slot 2311b, a shaft end of the second driving bevel gear 2313 is sleeved onto the interior of the second inner bearing 2317, such that the second driving bevel gear 2313 is rotatably connected to the bracket 2311. The second outer bearing 23110 is sleeved onto the exterior of the other shaft end of the second driving bevel gear 2313. The third inner bearing 2318 and the third outer bearing 23111 are both fixed inside the third sink slot 2311*c*, and both shaft ends of the first planetary gear 2314 are respectively sleeved onto the interior of the third inner bearing 2318 and the interior of the third outer bearing 23111, such that the first planetary gear 2314 is rotatably connected to the bracket 2311.

When the first driving bevel gear 2312, the second driving bevel gear 2313, and the first planetary gear 2314 are all rotatably connected to the bracket 2311, the first driving bevel gear 2312 and the second driving bevel gear 2313 are oppositely disposed, the first planetary gear 2314 is disposed between the first driving bevel gear 2312 and the second driving bevel gear 2313, and the first planetary gear 2314 is in mesh with the first driving bevel gear 2312 and the second driving bevel gear 2313, such that the first driving bevel gear 2312 and the second driving bevel gear 2313 may drive the first planetary gear 2314 to rotate. The fourth outer bearing 23112 is fixed into the fourth sink slot 2311*d*, and the supporting member 2315 is sleeved onto the interior of the fourth outer bearing 23112, such that the supporting member 2315 is rotatably connected to the bracket 2311. The supporting member 2315 and the first planetary gear 2314 are both fixed to the grabber. When the first planetary gear 2314 rotates, the first planetary gear 2314 drives the grabber to rotate, and the supporting member 2315 rotates accordingly as a driven member.

It may be understood that in some other embodiments, the bevel gear driving device 231 may not include the supporting member 2315 and the fourth outer bearing 23112, and the grabber may be directly fixed to the first planetary gear 2314. In addition, the first driving bevel gear 2312, the second driving bevel gear 2313, the first planetary gear 2314, and the supporting member 2315 may be rotatably connected to the bracket 2311 in other modes other than to the above described mode, which are not described herein any further. The structure of the bracket 2311 may also be other structures having the same bearing and connection effects, which are not described herein any further.

With respect to the connecting member 232, as illustrated in FIG. 7, the connecting member 232 includes a first connecting plate 2321 and a second connecting plate 2322. One end of the first connecting plate 2321 is fixed to the case of the wrist effector 22, the other end of the first connecting plate 2321 is fixed to an outer ring of the first outer bearing 2319, one end of the second connecting plate 2322 is fixed to the case of the wrist effector 22, and the other end of the second connecting plate 2322 is fixed to an outer ring of the second outer bearing 23110, such that one end of the connecting member 232 is fixed to the case of the wrist effector 22, and the other end of the connecting member 232 is rotatably connected to the bevel gear driving device 231.

It may be understood that the connecting member 232 may be rotatably connected to the bevel gear driving device 231 in other modes other than the above described mode. For example, the bevel gear driving device 231 does not include the first outer bearing 2319 and the second outer bearing 23110, a first shaft hole (not shown in the drawings) and a second shaft hole (not shown in the drawings) are defined on the bracket 2311, the end of the first connecting plate 2321 is fixed to the wrist effector 22, and the other end of the first connecting plate 2321 is provided with a protrusion (not shown in the drawings), wherein the first protrusion (not shown in the drawings) is inserted into the first shaft hole (not shown in the drawings), and the first protrusion (not shown in the drawings) is rotatable relative to the first shaft hole (not shown in the drawings); and the end of the second connecting plate 2322 is fixed to the wrist effector 22, and the other end of the second connecting plate 2322 is provided with a second protrusion (not shown in the drawings), wherein the second protrusion (not shown in the drawings) is inserted into the second shaft hole (not shown in the drawings), and the second protrusion (not shown in the drawings) is rotatable relative to the second shaft hole (not shown in the drawings). In addition, the connecting member 232 may also be another device achieving the same connection effect, which is not described herein any further.

With respect to the first transmission device 233, as illustrated in FIG. 7 and FIG. 8, the first transmission device 233 includes a first belt 2331, a first pulley 2332, and a second pulley 2333. The first pulley 2332 is connected to the first output shaft 221 of the wrist effector 22, the second pulley 2333 is connected to the first driving bevel gear 2312, and the first belt 2331 is sleeved onto the first pulley 2332 and the second pulley 2333. When the first output shaft 221 of the wrist effector 22 rotates, the first output shaft 221 drives the first pulley 2332 to rotate, the first pulley 2332 drives, by the first belt 2331, the second pulley 2333 to rotate, the second pulley 2333 drives the first driving bevel gear 2312 to rotate, such that the first transmission device 233 is connected to the first output shaft 221 of the wrist effector 22 and the first driving bevel gear 2312 respectively, and the first output shaft 221 of the wrist effector 22 is configured to drive the first driving bevel gear 2312 to rotate.

With respect to the second transmission device 234, still referring to FIG. 7 and FIG. 8, the second transmission device 234 includes a second belt 2341, a third pulley 2342, and a fourth pulley 2343. The third pulley 2342 is connected to the second output shaft 222 of the wrist effector 22, the fourth pulley 2343 is connected to the second driving bevel gear 2313, and the second belt 2341 is sleeved onto the third pulley 2342 and the fourth pulley 2343. When the second output shaft 222 of the wrist effector 22 rotates, the second output shaft 222 drives the third pulley 2342 to rotate, the third pulley 2342 drives, by the second belt 2341, the fourth pulley 2343 to rotate, the fourth pulley 2343 drives the second driving bevel gear 2313 to rotate, such that the second transmission device 234 is connected to the second output shaft 222 of the wrist effector 22 and the second driving bevel gear 2313 respectively, and the second output shaft 222 of the wrist effector 22 is configured to drive the second driving bevel gear 2312 to rotate.

It may be understood that in other embodiments, the first transmission device 233 and the second transmission device 234 may also be other transmission devices achieving the same transmission effect, for example, a gear transmission device or the like.

For ease of understanding on how the multi-DOF connecting device 23 drives the grabber 24 to rotate in two directions, hereinafter, the principles of driving the grabber 24 to rotate by the multi-DOF connecting device 23 is described in detail:

(1) When the rotation speed and rotation direction of the first output shaft 221 are the same as those of the second output shaft 222, the rotation speed and rotation direction of the first driving bevel gear 2312 are also the same as those of the second driving bevel gear 2313. In addition, since the first planetary gear 2314 is in mesh with the first driving bevel gear 2312 and the second driving bevel gear 2313, the magnitudes and directions of the forces applied to gear surfaces on both sides of the first planetary gear 2314 are both the same. Therefore, the first planetary gear 2314 fails to rotate by itself, and the first planetary 2314 and the bracket 2311 both rotate with the axial lines of the first driving bevel gear 2312 and the second driving bevel gear 2313 as a central line, such that the grabber 24 is driven to rotate in a first direction.

(2) When the rotation speed of the first output shaft 221 is the same as that of the second output shaft 222 but the rotation direction of the first output shaft 221 is contrary to that of the second output shaft 222, the magnitudes of the force applied to the gear surfaces on both sides of the first planetary gear 2314 are the same but the directions of the forces are contrary to each other. That is, a resultant force of a shearing force applied to a radial direction of the first planetary gear 2314 is 0, but a force difference is present on the gear surfaces on both sides of the first planetary gear 2314. Therefore, the first planetary gear 2314 fails to rotate with the axial lines of the first driving bevel gear 2312 and the second driving bevel gear 2313 as a central line, and the first planetary gear 2314 may rotate by itself, such that the grabber 24 is driven to rotate in a second direction. The first direction is different from the second direction.

Figure 14:
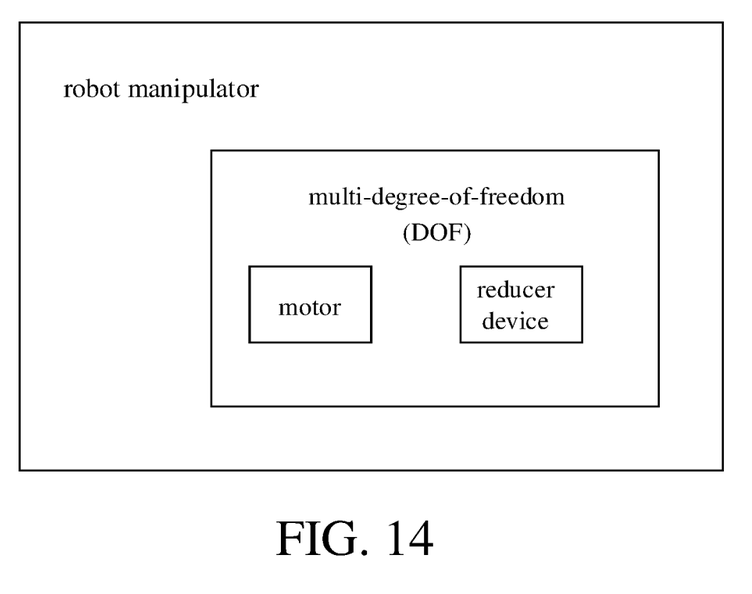
FIG. 14 is a schematic structural diagram of a multi-DOF connecting device, motor and reducer device according to still another embodiment of the present application.

(3) When the rotation speed of the first output shaft 221 is different from that of the second output shaft 222 but the rotation direction of the first output shaft 221 is the same as that of the second output shaft 222, the directions of the forces applied to the gear surfaces on both sides of the first planetary gear 2314 are the same. That is, a resultant force of a shearing force applied to a radial direction of the first planetary gear 2314 is not 0, and a force difference is present on the gear surfaces on both sides of the first planetary gear 2314. Therefore, the first planetary gear 2314 and the bracket 2311 both rotate with the axial lines of the first driving bevel gear 2312 and the second driving bevel gear 2313 as a central line, and meanwhile the first planetary gear 2314 may rotate by itself, such that the grabber 24 is driven to rotate in the first direction and the second direction simultaneously. In some other embodiments, the first output shaft 221 and the second output shaft 222 may also be driven by the same motor 236, such that the rotation speeds of the first output shaft 221 and the second output shaft 222 are different but the rotation directions of the first output shaft 221 and the second output shaft 222 are the same. The multi-DOF connecting device 23 may include a reducer device 235. One end of the first output shaft 221 or the second output shaft 222 may be connected to the reducer device 235. In this way, likewise, the rotation speed of the first output shaft 221 and the second output shaft 222 is different, such that the grabber 24 rotates in two different directions simultaneously.

Figure 12:
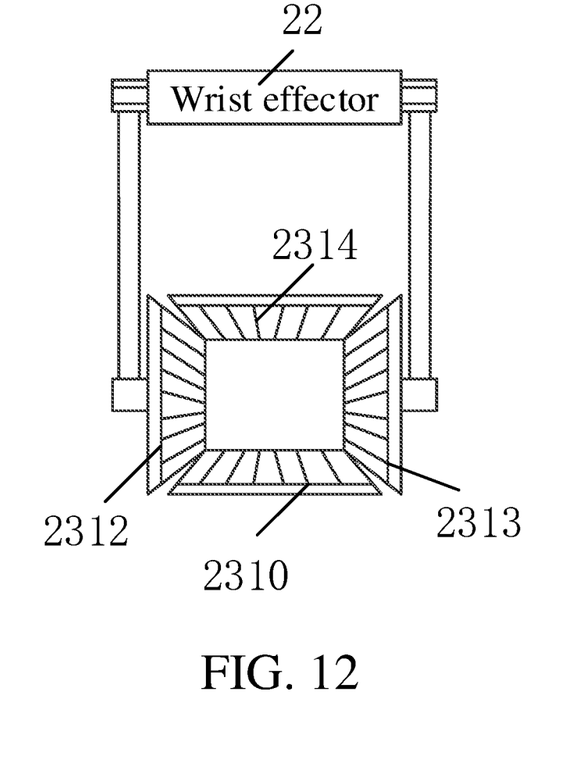
FIG. 12 is a schematic view of a multi-DOF connecting device of the robot manipulator according to another embodiment of the present application.

In some other embodiments, the supporting member 2315 in the bevel gear driving device 231 may also be replaced by a second planetary gear 2310. As illustrated in FIG. 12, one shaft end of the secondary planetary gear 2310 is sleeved onto the interior of the fourth outer bearing 23112, such that the second planetary gear 2310 is rotatably connected to the bracket 2311. The secondary planetary 2310 is further in mesh with the first driving bevel gear 2312 and the second driving bevel gear 2313 respectively. The grabber 24 is connected to the first planetary 2314 and the second planetary gear 2310 respectively. The second planetary gear 2310 rotates in the same mode as the first planetary gear 2314, which is not described herein any further.

It may be understood that in other embodiments, the number of motors of the wrist effector 22 may also be 3 or 4 or the like, and correspondingly, the wrist effector 22 may drive, by the multi-DOF connecting device 23, the grabber 24 to rotate in three or four different directions, which is not described herein any further.

Figure 13:
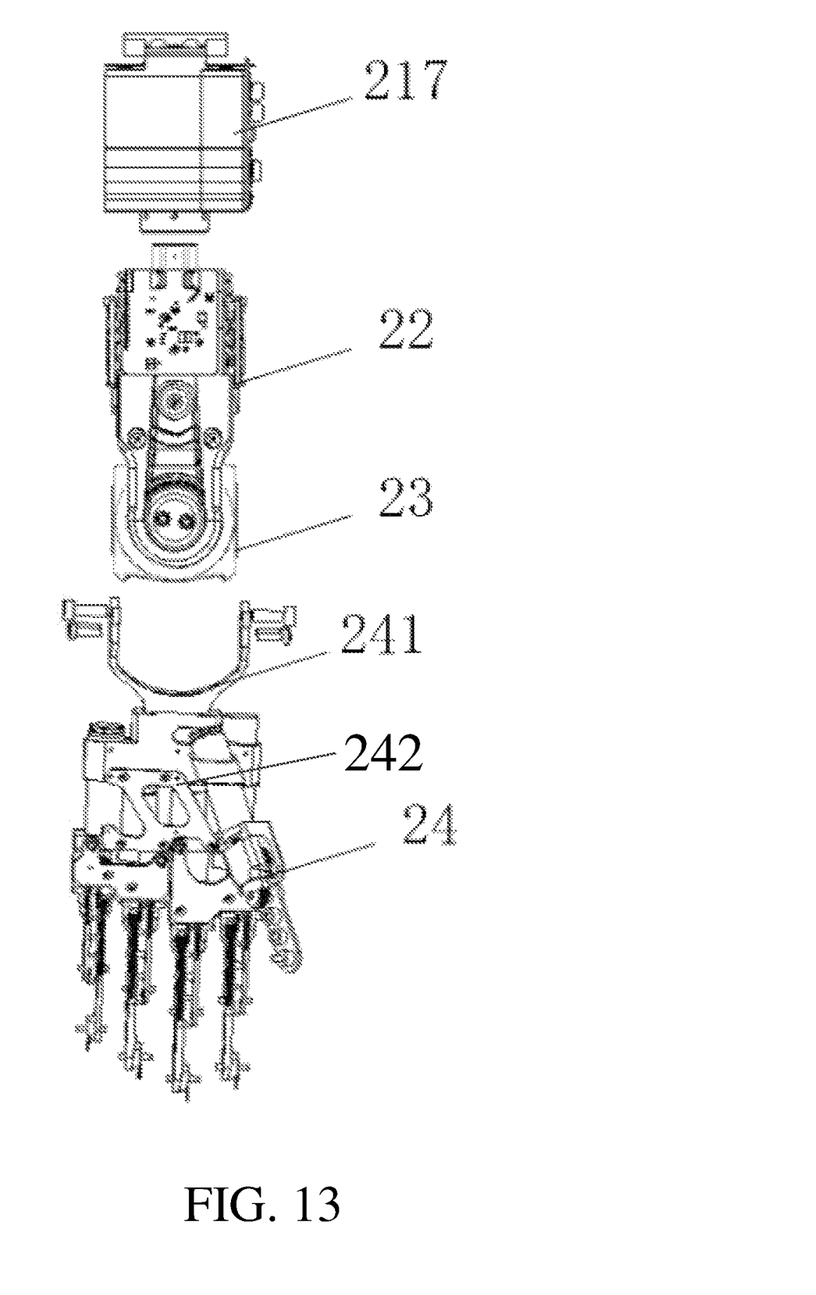
FIG. 13 is another exploded view of the robot manipulator according to an embodiment of the present application.

With respect to the grabber 24, as illustrated in FIG. 13, the grabber 24 includes a grabber body 242 and a U-shaped connecting frame 241. One end of the grabber body 242 is connected to the U-shaped connecting frame 241. One stand of the U-shaped connecting frame 241 is threaded to a shaft end face of the first planetary gear 2314, and the other stand of the U-shaped connecting frame 241 is threaded to a shaft end face of the second planetary gear 2310 or the supporting member 2315. When the first planetary gear 2314 and the second planetary gear 2310 rotate, or only the first planetary gear 2314 rotates, the grabber 24 also rotates accordingly.

It may be understood that the U-shaped connecting frame 241 may also be another device achieving the same connection effect, which is not described herein any further.

Nevertheless, in some other embodiments, the robot manipulator 20 may also include a plurality of multi-DOF connecting devices 23, such that the number of joints of the robot manipulator 20 is further reduced, the weight of the robot manipulator 20 is lightened, and the integration degree is enhanced. In addition, during movement control of the robot manipulator 20, a tail-end posture of the robot manipulator 20 is collaboratively determined by the joints in front of the tail end. The more the joints in the front of the tail end, the more complex of the algorithms for movement trajectory planning and control of the robot manipulator 20. However, if the number of joints is small, the degree of freedom of the robot manipulator 20 is lowered, and thus the flexibility is reduced. According to the present application, the number of joints may be reduced and the complexity of movement trajectory planning and control of the robot manipulator 20 is lowered, while the flexibility is ensured.

According to the embodiment of the present application, the multi-DOF connecting device 23 is connected to the wrist effector 22 and the grabber 24 respectively, the multi-DOF connecting device 23 transmits the power of the wrist effector 22 to the grabber 24, such that the grabber may rotate in a plurality of different directions under driving by the wrist effector 22. In this way, the wrist effector 22 controls the grabber 24 of the robot manipulator 24 to rotate in the plurality of different directions, such that the number of effectors is reduced without changing the degree of freedom of the robot manipulator 20. In this way, the structure of the robot manipulator 20 is more compact, and the integration degree is enhanced. In addition, according to the embodiment of the present application, the arm body 21 is divided into different effectors and connecting frames, such that the modularization degree of the robot manipulator 20 is improved, which is favorable to assembling, repair and part replacement of the robot manipulator 20.

An embodiment of the present application further provides a robot. The robot includes a robot manipulator. The robot manipulator has the same structure and functionality as the robot manipulator according to the above embodiment. For details of the structure and functionality of the robot manipulator, reference may be made to the above embodiments, which is not described herein any further.

It should be finally noted that the above-described embodiments are merely for illustration of the present application, but are not intended to limit the present application. Although the present application is described in detail with reference to these embodiments, a person skilled in the art may also make various modifications to the technical solutions disclosed in the embodiments, or make equivalent replacements to a part of or all technical features contained therein. Such modifications or replacement, made without departing from the principles of the present application, shall fall within the scope defined by the claims and the specification of the present application. Especially, various technical features mentioned in various embodiments may be combined in any mode as long as there is no structural conflict. The present application is not limited to the specific embodiments described herein in this specification, but also includes all the technical solutions falling within the scope subject to the appended claims.

What is claimed is:

1. A robot manipulator, comprising:
an arm body;
a wrist effector, connected to the arm body;
a multi-degree-of-freedom (DOF) connecting device, rotatably connected to the wrist effector; and
a grabber, connected to the multi-DOF connecting device, wherein the multi-DOF connecting device is configured to receive a power output by the wrist effector and drive the grabber to rotate;
wherein the multi-DOF connecting device comprises a connecting member, a first transmission device, a second transmission device, and a bevel gear driving device, wherein the bevel gear driving device comprises a bracket, a first driving bevel gear, a second driving bevel gear, a first planetary gear, a first inner bearing, a second inner bearing, a third inner bearing, a first outer bearing, a second outer bearing, a third outer bearing; the first driving bevel gear, the second driving bevel gear, and the first planetary gear are all rotatable connected to the bracket;
the bracket is provided with a first sink slot, a second sink slot, and a third sink slot; wherein, the first sink slot and the second sink slot are oppositely disposed, the third sink slot is communicated with the first sink slot and the second sink slot respectively;
the first inner bearing is fixed to the first sink slot; a shaft end of the first driving bevel gear is sleeved onto of the interior of the first inner bearing, the first outer bearing is sleeved onto the exterior of the other shaft end of the first driving bevel gear; the second inner bearing is fixed into the second sink slot, a shaft end of the second driving bevel gear is sleeved onto the interior of the second inner bearing, the second outer bearing is sleeved onto the exterior of the other shaft end of the second driving bevel gear; the third inner bearing and the third outer bearing are both fixed inside the third sink slot, and both shaft ends of the first planetary gear are respectively sleeved onto the interior of the third inner bearing and the interior of the third outer bearing;
wherein one end of the connecting member is connected to the wrist effector and the other end of the connecting member is rotatably connected to the bracket, the first driving bevel gear and the second driving bevel gear are oppositely disposed, the first planetary gear is disposed between the first driving bevel gear and the second driving bevel gear, and the first planetary gear is in mesh with the first driving bevel gear and the second driving bevel gear respectively; and
the first transmission device is connected to a first output shaft of the wrist effector and the first driving bevel gear respectively, the first output shaft of the wrist effector is configured to drive the first driving bevel gear to rotate, the second transmission device is connected to a second output shaft of the wrist effector and the second driving bevel gear respectively, the second output shaft of the wrist effector is configured to drive the second driving bevel gear to rotate, and the grabber is connected to the first planetary gear.

2. The robot manipulator according to claim 1, wherein the first transmission device comprises a first belt, a first pulley, and a second pulley; wherein the first pulley is connected to the first output shaft of the wrist effector, the second pulley is connected to the first driving bevel gear, and the first belt is sleeved onto the first pulley and the second pulley.

3. The robot manipulator according to claim 1, wherein the second transmission device comprises a second belt, a third pulley, and a fourth pulley; wherein the third pulley is connected to the second output shaft of the wrist effector, the fourth pulley is connected to the second driving bevel gear, and the second belt is sleeved onto the third pulley and the fourth pulley.

4. The robot manipulator according to claim 1, wherein the multi-DOF connecting device comprises a second planetary gear; wherein
the second planetary gear is rotatably connected to the bracket, the second planetary gear is disposed between the first driving bevel gear and the second driving bevel gear, and the second planetary gear is in mesh with the first driving bevel gear and the second driving bevel gear respectively; and
the grabber is connected to the second planetary gear; wherein the grabber comprises a grabber body and a U-shaped connecting frame; wherein one end of the grabber body is connected to the U-shaped connecting frame, and two stands of the U-shaped connecting frame are respectively connected to the first planetary gear and the second planetary gear.

5. The robot manipulator according to claim 1, wherein the arm body comprises a lift boom effector, an incline boom effector, a first connecting frame, a rotate elbow effector, an elbow effector, a second connecting frame, and a rotate wrist effector; wherein
a case of the incline boom effector is connected to an output end of the lift boom effector, one end of the first connecting frame is connected to an output end of the incline boom effector, a case of the rotate elbow effector is connected to the other end of the first connecting frame, a case of the elbow effector is connected to an output end of the rotate elbow effector, one end of the second connecting frame is connected to an output end of the elbow effector, a case of the rotate wrist effector is connected to the other end of the second connecting frame, and a case of the wrist effector is connected to an output end of the rotate wrist effector.

6. The robot manipulator according to claim 5, wherein the first connecting frame comprises a first connecting stand plate and a second connecting stand plate; wherein one end of the first connecting stand plate is connected to the output end of the incline boom effector, one end of the second connecting stand plate is rotatably connected to the case of the incline boom effector, the other ends of the first connecting stand plate and the second connecting stand plate are both connected to the case of the rotate elbow effector, and the first connecting stand plate and the second connecting stand plate are parallelly disposed.

7. The robot manipulator according to claim 6, wherein the first connecting frame comprises a connecting bearing; wherein one end of the second connecting stand plate is connected to the case of the incline boom effector by the connecting bearing.

8. The robot manipulator according to claim 6, wherein the first connecting frame comprises a fixing plate; wherein the fixing plate is connected to the rotate elbow effector, and the other ends of the first connecting stand plate and the second connecting stand plate are both connected to the fixing plate.

9. The robot manipulator according to claim 5, wherein the second connecting frame comprises a third connecting stand plate and a fourth connecting stand plate; wherein one end of the third connecting stand plate is connected to the output end of the elbow effector, the other end of the third connecting stand plate is connected to the case of the rotate wrist effector, one end of the fourth connecting stand plate is rotatably connected to the case of the elbow effector, and the other end of the fourth connecting stand plate is connected to the case of the rotate wrist effector.

10. A robot, comprising at least one robot manipulator, the robot manipulator, comprises:
    an arm body;
    a wrist effector, connected to the arm body;
    a multi-degree-of-freedom (DOF) connecting device, rotatably connected to the wrist effector; and
    a grabber, connected to the multi-DOF connecting device, wherein the multi-DOF connecting device is configured to receive a power output by the wrist effector and drive the grabber to rotate;
    wherein the multi-DOF connecting device comprises a connecting member, a first transmission device, a second transmission device, and a bevel gear driving device, wherein the bevel gear driving device comprises a bracket, a first driving bevel gear, a second driving bevel gear, a first planetary gear, a first inner bearing, a second inner bearing, a third inner bearing, a first outer bearing, a second outer bearing, a third outer bearing; the first driving bevel gear, the second driving bevel gear, and the first planetary gear are all rotatable connected to the bracket;
    the bracket is provided with a first sink slot, a second sink slot, and a third sink slot; wherein, the first sink slot and the second sink slot are oppositely disposed, the third sink slot is communicated with the first sink slot and the second sink slot respectively;
    the first inner bearing is fixed to the first sink slot; a shaft end of the first driving bevel gear is sleeved onto of the interior of the first inner bearing, the first outer bearing is sleeved onto the exterior of the other shaft end of the first driving bevel gear; the second inner bearing is fixed into the second sink slot, a shaft end of the second driving bevel gear is sleeved onto the interior of the second inner bearing, the second outer bearing is sleeved onto the exterior of the other shaft end of the second driving bevel gear; the third inner bearing and the third outer bearing are both fixed inside the third sink slot, and both shaft ends of the first planetary gear are respectively sleeved onto the interior of the third inner bearing and the interior of the third outer bearing;
    wherein one end of the connecting member is connected to the wrist effector and the other end of the connecting member is rotatably connected to the bracket, the first driving bevel gear and the second driving bevel gear are oppositely disposed, the first planetary gear is disposed between the first driving bevel gear and the second driving bevel gear, and the first planetary gear is in mesh with the first driving bevel gear and the second driving bevel gear respectively; and
    the first transmission device is connected to a first output shaft of the wrist effector and the first driving bevel gear respectively, the first output shaft of the wrist effector is configured to drive the first driving bevel gear to rotate, the second transmission device is connected to a second output shaft of the wrist effector and the second driving bevel gear respectively, the second output shaft of the wrist effector is configured to drive the second driving bevel gear to rotate, and the grabber is connected to the first planetary gear.

11. The robot according to claim 10, wherein the first transmission device comprises a first belt, a first pulley, and a second pulley; wherein the first pulley is connected to the first output shaft of the wrist effector, the second pulley is connected to the first driving bevel gear, and the first belt is sleeved onto the first pulley and the second pulley.

12. The robot according to claim 10, wherein the second transmission device comprises a second belt, a third pulley, and a fourth pulley; wherein the third pulley is connected to the second output shaft of the wrist effector, the fourth pulley is connected to the second driving bevel gear, and the second belt is sleeved onto the third pulley and the fourth pulley.

13. The robot according to claim 10, wherein the multi-DOF connecting device comprises a second planetary gear; wherein
    the second planetary gear is rotatably connected to the bracket, the second planetary gear is disposed between the first driving bevel gear and the second driving bevel gear, and the second planetary gear is in mesh with the first driving bevel gear and the second driving bevel gear respectively; and
    the grabber is connected to the second planetary gear; wherein the grabber comprises a grabber body and a U-shaped connecting frame; wherein one end of the grabber body is connected to the U-shaped connecting frame, and two stands of the U-shaped connecting frame are respectively connected to the first planetary gear and the second planetary gear.

14. The robot according to claim 10, wherein the first output shaft and the second output shaft driven by the same motor, one end of the first output shaft or the second output shaft connected to reducer device.

15. The robot according to claim 10, the first output shaft and the second output shaft are coaxial symmetry.

16. The robot manipulator according to claim 1, wherein the first output shaft and the second output shaft driven by the same motor, one end of the first output shaft or the second output shaft connected to reducer device.

17. The robot manipulator according to claim 1, the first output shaft and the second output shaft are mutually parallel and coaxial symmetry.

* * * * *